US009874988B2

(12) United States Patent
Lim et al.

(10) Patent No.: US 9,874,988 B2
(45) Date of Patent: Jan. 23, 2018

(54) ELECTROMAGNETIC INDUCTION PANEL, ELECTROMAGNETIC INDUCTION DEVICE INCLUDING THE SAME, AND DISPLAY DEVICE INCLUDING THE SAME

(71) Applicant: Samsung Display Co., Ltd., Yongin-si (KR)

(72) Inventors: Sang-Hyun Lim, Cheonan-si (KR); Chang-Sub Jung, Hwaseong-si (KR); A-Ra Jo, Seoul (KR); Eun-Gil Choi, Cheonan-si (KR); Jae-Woo Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 1 day.

(21) Appl. No.: 15/094,264

(22) Filed: Apr. 8, 2016

(65) Prior Publication Data

US 2017/0108969 A1 Apr. 20, 2017

(30) Foreign Application Priority Data

Oct. 14, 2015 (KR) .................. 10-2015-0143250

(51) Int. Cl.
*G06F 3/046* (2006.01)
*G06F 3/041* (2006.01)
*H01F 27/38* (2006.01)
*H01F 38/14* (2006.01)

(52) U.S. Cl.
CPC ............ *G06F 3/046* (2013.01); *G06F 3/0412* (2013.01); *G06F 3/0416* (2013.01); *H01F 27/38* (2013.01); *H01F 38/14* (2013.01)

(58) Field of Classification Search
CPC ...... G06F 3/046; G06F 3/0412; G06F 3/0416; H01F 38/14; H01F 27/38
See application file for complete search history.

(56) References Cited

U.S. PATENT DOCUMENTS

| | | | |
|---|---|---|---|
| 2013/0119779 A1* | 5/2013 | Jung | ........... H01F 27/2871 307/104 |
| 2014/0339907 A1* | 11/2014 | Omae | .............. H01F 38/14 307/104 |
| 2015/0137746 A1* | 5/2015 | Lee | .................. H02J 5/005 320/108 |

(Continued)

FOREIGN PATENT DOCUMENTS

| | | |
|---|---|---|
| JP | 2011-203918 | 10/2011 |
| KR | 10-2009-0123647 | 12/2009 |
| KR | 10-2011-0136953 | 12/2011 |

(Continued)

*Primary Examiner* — Liliana Cerullo
(74) *Attorney, Agent, or Firm* — H.C. Park & Associates, PLC (57) ABSTRACT

An electromagnetic induction panel includes a substrate including a first region, a second region, and a third region, a first induction coil arranged along an edge of the first region of the substrate and wound in a first winding direction, a second induction coil arranged along an edge of the second region and wound in a second winding direction opposite to the first winding direction, the second region surrounding the first region, and a third induction coil arranged along an edge of the third region and wound in the second winding direction, the third region surrounding the second region.

19 Claims, 9 Drawing Sheets

(56) References Cited

U.S. PATENT DOCUMENTS

2016/0001663 A1* 1/2016 Chae ..................... B60L 1/006
                                                                  307/9.1

FOREIGN PATENT DOCUMENTS

| KR | 10-1355940 | 1/2014 |
| KR | 10-2014-0049300 | 4/2014 |
| KR | 10-1515782 | 5/2015 |

* cited by examiner

ELECTROMAGNETIC INDUCTION PANEL, ELECTROMAGNETIC INDUCTION DEVICE INCLUDING THE SAME, AND DISPLAY DEVICE INCLUDING THE SAME

CROSS-REFERENCE TO RELATED APPLICATION

This application claims priority from and the benefit of Korean Patent Application No. 10-2015-0143250, filed on Oct. 14, 2015, which is hereby incorporated by reference for all purposes as if fully set forth herein.

BACKGROUND

Field

Exemplary embodiments relate to a display device. More particularly, exemplary embodiments relate to an electromagnetic induction panel-driving an external component by using an electromagnetic induction technique, an electromagnetic induction device including the electromagnetic induction panel, and a display device including the electromagnetic induction panel.

Discussion of the Background

An electromagnetic induction technique generates a magnetic field by providing a current to a first coil and generates an induced electromotive force (or, an induction electromagnetic power, an induced current) at a second coil in association with the magnetic field. Recently, the electromagnetic induction technique is used for a wireless charging device, digitizer, etc.

A digitizer includes a tablet and an electronic pen. The tablet has a plate shape, includes the first coil (e.g., a solenoid coil) arranged along an edge of the tablet, and generates a first magnetic field by the current in the first coil. The electronic pen stores an induced electromotive force generated by the second coil based on the first magnetic field and generates a second magnetic field based on the induced electromotive force. Thus, the digitizer recognizes a position of the electronic pen based on the second magnetic field.

However, the first magnetic field is concentrated at a center of the tablet surrounded by the first coil in accordance with characteristics of the first coil, and the first magnetic field appears as insignificant at an area in which the first coil is arranged (i.e., an edge of the tablet). That is, the tablet has a shade area of the first magnetic field at the area in which the first coil is arranged. In this case, the digitizer may not recognize the electronic pen when the electronic pen is in the shade area of the first magnetic field.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an electromagnetic induction panel having no shade area of magnetic field.

Additional aspects will be set forth in the detailed description which follows, and, in part, will be apparent from the disclosure, or may be learned by practice of the inventive concept.

Exemplary embodiments provide an electromagnetic induction device including the electromagnetic induction panel.

Exemplary embodiments provide a display device including the electromagnetic induction panel.

According to example embodiments, an electromagnetic induction panel may include a substrate including a first region, a second region, and a third region; a first induction coil arranged along an edge of the first region of the substrate and wound in a first winding direction; a second induction coil arranged along an edge of the second region and wound in a second winding direction opposite to the first winding direction, the second region surrounding the first region; and a third induction coil arranged along an edge of the third region and wound in the second winding direction, the third region surrounding the second region.

In example embodiments, the second induction coil may generate a first sub magnetic field associated with a second current of the second induction coil, where the first sub magnetic field penetrates the first region.

In example embodiments, the first induction coil and the third induction coil may generate a second sub magnetic field associated with a first current of the first induction coil and a third current of the third induction coil, where the second sub magnetic field penetrates at least one of the second region and the third region.

In example embodiments, a terminal of the first induction coil may be electrically connected to a terminal of the third induction coil, and the first current may be the third current.

According to example embodiments, an electromagnetic induction device may include an electromagnetic induction panel and a power supplier. Here, the electromagnetic induction panel may include a substrate including a first region, a second region, and a third region; a first induction coil arranged along an edge of a first region of the substrate and winded in a first winding direction; a second induction coil arranged along an edge of a second region and winded in a second winding direction opposite to the first winding direction, the second region surrounding the first region; and a third induction coil arranged along an edge of a third region and winded in the second winding direction, the third region surrounding the second region. The power supplier may provide a first current to the first induction coil or a second current to the second induction coil according to each of selected modes. The power supplier may provide a third current to the third induction coil in at least one mode among the operation modes.

In example embodiments, the second induction coil may generate a first sub magnetic field associated with the second current, and the first induction coil and the third induction coil may generate a second sub magnetic field associated with the first current and the third current, where the first sub magnetic field penetrates the first region, and the second sub magnetic field penetrates the second region.

In example embodiments, the power supplier may sense an induction magnetic field, which is generated by an external component, using at least one selected among the first induction coil, the second induction coil, and the third induction coil.

In example embodiments, the electromagnetic induction device may further include a loop antenna disposed along a boundary between the first region and the second region of the electromagnetic induction panel, and a sensor to sense an induction magnetic field generated by an external component using the loop antenna.

In example embodiments, the sensor may determine a position of the external component above the electromagnetic induction panel based on the induction magnetic field.

In example embodiments, the electromagnetic induction device may further include a controller to select one among a first mode and a second mode based on the position of the external component, where the power supplier provides the second current to the second induction coil in the first mode and provides the first current to the first induction coil in the second mode.

In example embodiments, the controller may select the first mode when the external component is above the first region and may select the second mode when the external component is above the second region or the third region.

In example embodiments, the controller may alternately select the first mode and the second mode before the sensor determines the position of the external component.

In example embodiments, a terminal of the first induction coil may be electrically connected to a terminal of the third induction coil, and the first current may be the third current.

In example embodiments, the power supplier may provide the third current to the third induction coil regardless of the first mode and the second mode.

In example embodiments, a first turns of the first induction coil may be greater than a third turns of the third induction coil.

In example embodiments, the first current may be larger than the third current.

According to example embodiments, a display device may include a display panel including pixels, an electromagnetic panel, a power supplier, and an external component. Here, the electromagnetic panel may include a substrate placed against the display panel; a first induction coil arranged along an edge of a first region of the substrate and wound in a first winding direction; a second induction coil arranged along an edge of a second region and wound in a second winding direction opposite to the first winding direction, the second region surrounding the first region; and a third induction coil arranged along an edge of a third region and wound in the second winding direction, the third region surrounding the second region. The power supplier may provide a third current to the third induction coil and may selectively provide a second current to the second induction coil or a first current to the first induction coil. The external component may generate a first induction power based on a first magnetic field generated by the electromagnetic induction panel and may generate an induction magnetic field based on the first induction power.

In example embodiments, the display device may further include a loop antenna disposed along a boundary between the first region and the second region of the electromagnetic induction panel, and a sensor to sense an induction magnetic field generated by the external component using the loop antenna and to determine a position of the external component above the electromagnetic induction panel based on the induction magnetic field.

In example embodiments, the display device may further include a controller to select one among a first mode and a second mode based on the position of the external component, wherein the power supplier provides the second current to the second induction coil in the first mode and provides the first current to the first induction coil in the second mode.

In example embodiments, the controller may determine whether the external device is detached from the display device and may select one among the first mode and the second mode or alternately select the first mode and the second mode when the external device is detached from the display device.

Therefore, an electromagnetic induction panel according to example embodiments may clear a shade area of a magnetic field (or, a primary magnetic field) generated by a second induction coil by including a first induction coil arranged inside the second induction coil and a third induction coil arranged outside the second induction coil and by generating a magnetic field (or, a secondary magnetic field) at a shade area of the second induction coil (i.e., a shade area of the magnetic field generated by the second induction coil) using the first and third induction coils.

In addition, an electromagnetic induction device and a display device according to example embodiments may reduce power consumption by including the electromagnetic induction panel and by providing a power to one selected among the first induction coil and the second induction coil based on a position of an external component (e.g., a charging device).

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
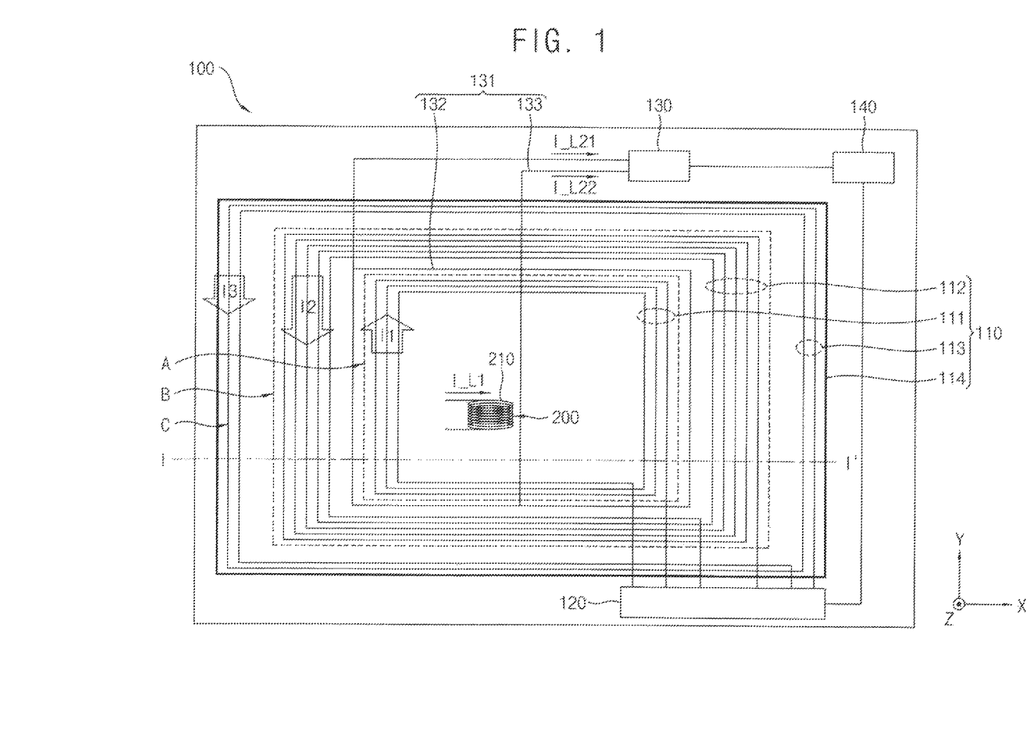
FIG. 1 is a diagram illustrating an electromagnetic induction device according to example embodiments.

FIG. 1 is a diagram illustrating an electromagnetic induction device according to example embodiments.

Referring to FIG. 1, the electromagnetic induction device 100 may include an electromagnetic induction panel 110, a power supplier 120, a sensor 130, and a controller 140. The electromagnetic induction device 100 may generate a first magnetic field through the electromagnetic induction panel 110. Accordingly, an external component 200 (e.g., a target device to be charged) may generate a second magnetic field (or, an induced magnetic field) based on the first magnetic field.

The electromagnetic induction panel 110 may include a substrate 114, a first induction coil 111 (or, a first auxiliary coil), a second induction coil 112 (or, a main coil), and a third induction coil 113 (or, a second auxiliary coil). The substrate 114 may be formed with a plate shape. The substrate 114 may include a first region A, a second region B surrounding the first region A, and a third region C surrounding the second region B. For example, the substrate 114 may be divided into the first region A, the second region B, and the third region C by shapes (e.g., rectangles), where the shapes have a center which is the same as a center of the substrate 114, have a same shape for each other, and have different widths (or, different radius, different areas) for each other.

The first induction coil 111 may be on the first region A of the substrate 114 and may be wound in a first winding direction. For example, the first induction coil 111 may be arranged along an edge (or, a border, or boundaries) of the first region A of the substrate 114 and may be wound in the first winding direction with first turns N1, where N1 is a positive integer. The second induction coil 112 may be on the second region B of the substrate 114 and may be wound in a second winding direction, where the second winding direction is opposite to the first winding direction. For example, the second induction coil 112 may be arranged along an edge of the second region B of the substrate 114 and may be wound in the second winding direction with second turns N2, where N2 is a positive integer. The third induction coil 113 may be on the third region C of the substrate 114 and may be wound in the second winding direction. For example, the third induction coil 113 may be arranged along an edge of the third region C of the substrate 114 and may be wound in the second winding direction with third turns N3, where N3 is a positive integer.

The second induction coil 112 may generate a first sub magnetic field (or, a mastery magnetic filed), which penetrates the first region A and which is formed in a third direction (e.g. positive direction of the z-axis) perpendicular to the first region A, based on a second current I2 (or, a second voltage, a second power). Here, the third direction may be perpendicular to a top surface of the electromagnetic induction panel 110. The first induction coil 111 and the third induction coil 113 may generate a second sub magnetic field (or, a secondary magnetic field), which penetrates the second region B and which is formed in the third direction, based on a first current I1 (and/or, a third current I3). That is, the electromagnetic induction panel 110 may generate the first sub magnetic field above the first region A using the second induction coil 112 and may generate the second sub magnetic field above the second region B (i.e., a region in which the second induction coil 112 is arranged) using the first induction coil 111 and the third induction coil 113. Therefore, the electromagnetic induction panel 110 may clear (or, remove, eliminate) a shade area of the first sub magnetic field (i.e., an area in which the first sub magnetic field is not formed, above the electromagnetic induction panel 110). That is, a first magnetic field may be formed above the top surface of the electromagnetic induction panel 110 without the shade area, where the first magnetic field includes the first sub magnetic field and the second sub magnetic field.

In some example embodiments, the second turns N2 of the second induction coil 112 may be greater than the first turns N1 of the first induction coil 111 and the third turns N3 of the third induction coil 113. In this case, the first magnetic field may be generated (or, be formed) intensively (or, concentrically) in the first region A.

In some example embodiments, the first turns N1 of the first induction coil 111 may be greater than the third turns N3 of the third induction coil 113. For example, the first current I1 flows through the first induction coil 111 and the third current I3 flows through the third induction coil 113, where the first current I1 may be the same as the third current I3 (or, where a magnitude of the first current I1 may be the same as a magnitude of the third current I3). In this case, the first magnetic field (or, the second sub magnetic field) may appear significantly in the second region B rather than in the third region C, because the first turns N1 of the first induction coil 111 is greater than the third turns N3 of the third induction coil 113. Therefore, the shade area (e.g., an area corresponding to the second region B and third region C) of the first sub magnetic field (or, the first magnetic field) generated by the second induction coil 112 may be cleared.

In some example embodiments, the first current I1 is greater than the third current I3. That is, a magnitude of the first current I1 may be greater than a magnitude of the third current I3. For example, the first current I1 flows through the first induction coil 111 and the third current I3 flows through the third induction coil 113, where the first turns N1 of the first current I1 may be the same as the third turns N3 of the third current I3. In this case, the first magnetic field (or, the second sub magnetic field) may appear significantly in the second region B rather than in the third region C, because the first current I1 is greater than the third current I3.

In some example embodiments, a terminal of the first induction coil 111 may be electrically connected to a terminal of the third induction coil 113. That is, the first induction coil 111 and the third induction coil 113 may generate the second sub magnetic field based on one current (e.g., the first current I1 or the third current I3, I1=I3).

The power supplier 120 may provide the third current I3 (or, a third voltage) to the third induction coil 113. Also, the power supplier 120 may provide the second current I2 (or, a second voltage) to the second induction coil 112 or the first current I1 (or, a first voltage) to the first induction coil 111.

For example, the power supplier 120 may provide the first voltage across the first induction coil 111, and the first current I1 may flow in a first rotation direction along a winding direction (i.e., the first winding direction) of the first induction coil 111. The power supplier 120 may provide the second voltage across the second induction coil 112, and the second current I2 may flow in a second rotation direction along a winding direction (i.e., the second winding direction) of the second induction coil 112. Similarly, the power supplier 120 may provide the third voltage across the third induction coil 113, and the third current I3 may flow in the second rotation direction along a winding direction (i.e., the second winding direction) of the third induction coil 113. Here, the second rotation direction may be opposite to the first rotation direction.

The external component 200 may generate a first induced power (or, a first induced electromagnetic force, a first induced current) based on the first magnetic field generated by the electromagnetic induction panel 110 and may generate a second magnetic field (or, an induced magnetic field) based on the first induced power. For example, the external component 200 may be an electronic pen or a mobile device.

The external component 200 may include a second coil 210 and a capacitor (not shown) that is electrically connected in parallel to the second coil 210. The first induced current I_L1 may flow through the second coil 210 based on the first magnetic field, and the capacitor may be charged based on the first induced current I_L1. When the first magnetic field is destroyed (or, when no current flows through the induction coils 111 through 113 of the electromagnetic induction panel 110), a fourth current (not shown) may flow through the second coil 210 according to discharging of the capacitor. The induced magnetic field may be generated based on the fourth current that flows through the second coil 210.

The sensor 130 may sense (or, detect, measure) the induced magnetic field generated by the external component 200 using a loop antenna 131. Here, the loop antenna 131 may be disposed on the electromagnetic induction panel 110. For example, the electromagnetic induction panel 110 may include the loop antenna 131 which is arranged along a boundary between the first region A and the second region B. The loop antenna 131 may include a first antenna 132, which forms a closed loop, and a second antenna 133 which is arranged across the first antenna 132. The sensor 130 may calculate a current difference (or a voltage difference) between a current I_L21 (or, an induced voltage), which is induced by the first antenna 132, and another current I_L22 (or, another induced voltage) which is induced by the second antenna 133. For example, the sensor 130 may differently amplify (or, differential-amplify) the current I_L21 and the current I_L22.

The sensor 130 may determine (or, decide, calculate) a position (or, a location) of the external component 200 above the electromagnetic induction panel 110 based on the induced magnetic field. For example, the sensor 130 may calculate the position of the external component 200 based on the current difference (or, the voltage difference) which is calculated. Here, the position may be represented as two-dimensional coordinates (or, as three-dimensional coordinates) with respect to the top surface of the electromagnetic induction panel 110.

In some example embodiments, the electromagnetic induction device 100 may sense the induced magnetic field, which is generated by the external component 200, using at least one among the first induction coil 111 through the third induction coil 113. For example, the current I_L21 may be induced in the first induction coil 111 based on the induced magnetic field. The electromagnetic induction device 100 may calculate strength (or, a magnitude) of the induced magnetic field based on the current I_L21. In this case, the first induction coil 111 for sensing the induced magnetic field may not be provided the current (or voltage) from the power supplier 120.

The controller 140 may control the power supplier 120. The controller 140 (or, the power supplier 120) may configure to operate in a first mode and a second mode. In this case, the power supplier 120 may provide the second current I2 to the second induction coil 112 in the first mode and may provide the first current I1 to the first induction coil 111 in the second mode.

In some example embodiments, the controller 140 may select one among the first mode and the second mode based on the induced magnetic field which is sensed. That is, the controller 140 may select one among the first mode and the second mode based on the position of the external component 200. For example, the controller 140 may select the first mode when the sensor 130 determines that the external component 200 is above the first region A. That is, the controller 140 may select the first mode, and the external component 200 (e.g., a battery of the mobile device) above the first region A may be charged. For example, the controller 140 may select the second mode when the sensor 130 determines that the external component 200 is above the second region B or above the third region C. That is, the controller 140 may select the second mode, and the external component 200 above the second region B or above the third region C may be charged.

In some example embodiments, the controller 140 may alternately select the first mode and the second mode with a certain period when the position of the external component 200 is not determined (or, before the sensor 130 determines the position of the external component 200). That is, when the position of the external component 200 is not identified, the controller 140 may control the power supplier 120 by alternately selecting the first mode and the second mode such that the first magnetic field is formed above the entire top surface of the electromagnetic induction panel 110.

As described above, the electromagnetic induction device 100 according to example embodiments may include the second induction coil 112, the first induction coil 111 arranged inside the second induction coil 112, and the third induction coil 113 arranged outside the second induction coil 112, and may generate the second sub magnetic field using the first induction coil 111 and the third induction coil 113. Therefore, the electromagnetic induction device 100 may clear (or, eliminate) the shade area (e.g., an area corresponding to the second region B and the third region C) of the first sub magnetic field generated by the second induction coil 112.

In addition, the electromagnetic induction device 200 may determine the position of the external component 200 based on the induced magnetic field generated by the external component 200 and may selectively determine an operation mode (e.g., the first mode in which the second current I2 is provided to the second induction coil 112, or the second mode in which the first current I1 is provided to the first induction coil 111) based on the position of the external component 200. Therefore, the electromagnetic induction device 100 may reduce consumption power.

Figure 2A:
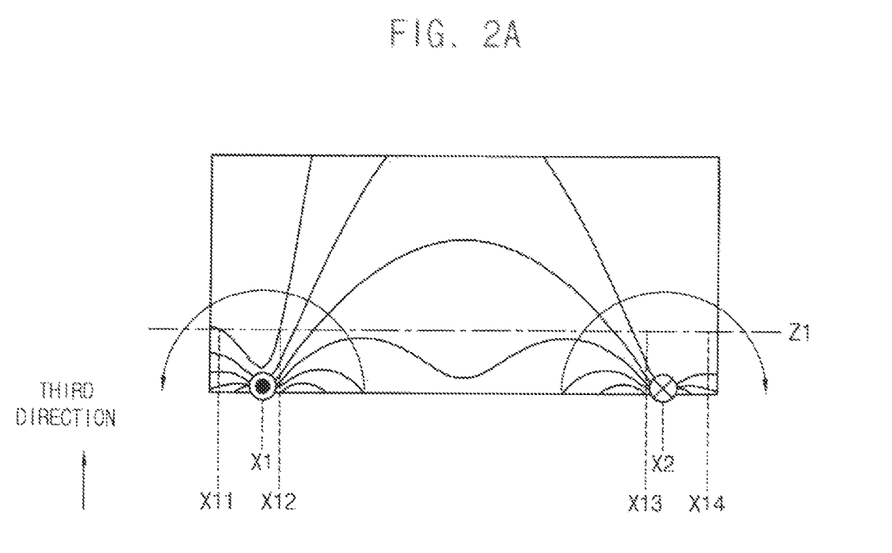
FIGS. 2A through 2C are diagrams illustrating examples of a magnetic field generated by an electromagnetic induction panel included in the electromagnetic induction device of FIG. 1.
Figure 2B:
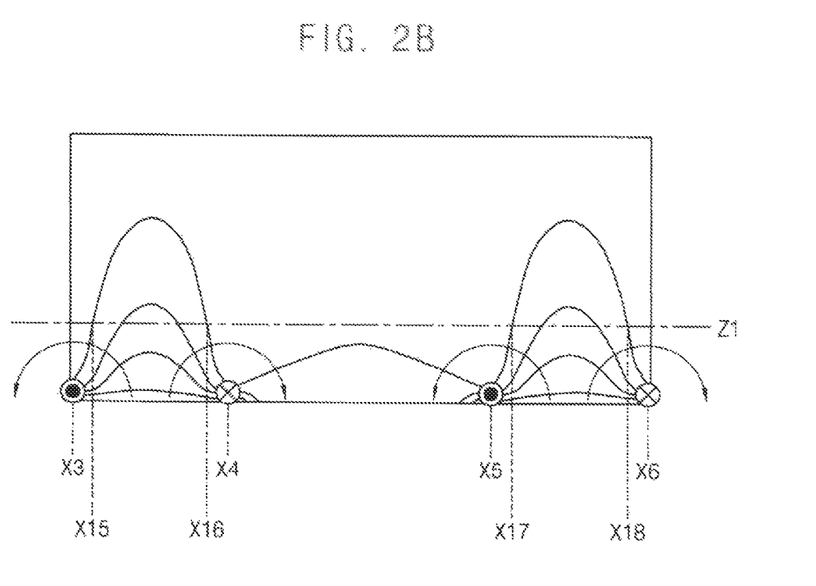
Figure 2C:
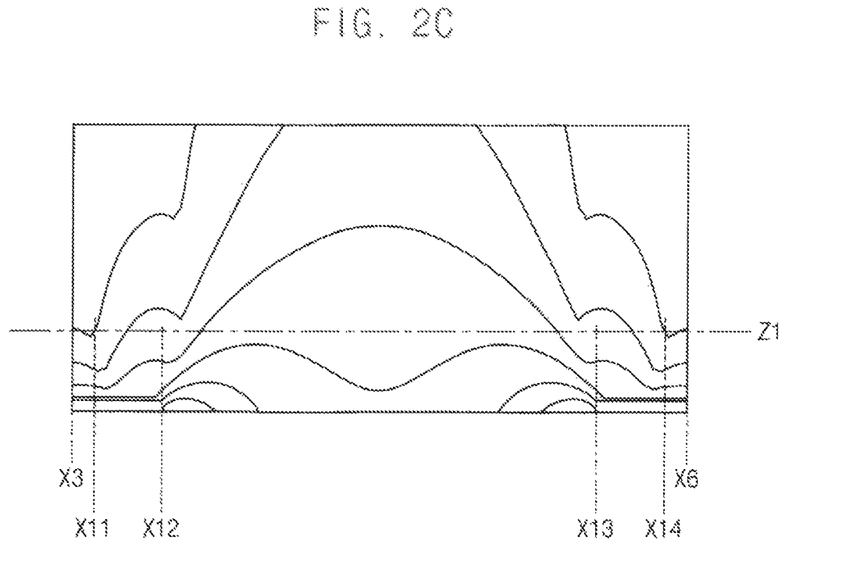

FIGS. 2A through 2C are diagrams illustrating examples of a magnetic field generated by an electromagnetic induction panel included in the electromagnetic induction device of FIG. 1. A cross-sectional view of the electromagnetic induction panel 110 with respect to an axis I-I' illustrated in FIG. 1 and a magnetic field generated above the electromagnetic induction panel 110 are illustrated in FIGS. 2A through 2C.

Referring to FIGS. 1 and 2A through 2C, the electromagnetic induction device 100 may provide power to the electromagnetic induction panel 110 in association with the first mode and the second mode. In the first mode, the electromagnetic induction device 100 may provide the second current I2 to the second induction coil 112. In the second mode, the electromagnetic induction device 100 may provide the first current I1 to the first induction coil 111 and may provide the third current I3 to the third induction coil 113.

A magnetic field generated by the electromagnetic induction device 100 in the first mode is illustrated in FIG. 2A. As illustrated in FIG. 2A, the first sub magnetic field may be formed above the electromagnetic induction panel 110 according to the second current I2 flowing through the second induction coil 112 (or, the second winding direction of the second induction coil 112). Referring to FIG. 1 and FIG. 2A, the second current I2 of the second induction coil 112 may flow in a direction into a second point X2 out of a first point X1 along the second winding direction. Since the second induction coil 112 is arranged through the first point X1 and the second point X2, the first sub magnetic field (or, a magnitude/flux of the first sub magnetic field) may appear strongly (or, intensively) between the first point X1 and the second point X2. In the location spaced apart from a top surface of the electronic induction panel 110 with a first distance Z1 in a third direction, the first sub magnetic field may appear strongly (or, intensively) between a twelfth point X12 and a thirteenth point X13 of the electromagnetic induction panel 110 (i.e. the first region A as shown in FIG. 1).

According to a characteristic of a coil (or, a characteristic of a solenoid coil), the first sub magnetic field may appear as insignificant (or, slightly) between a eleventh point X11 and the twelfth point X12 and between the thirteenth point X13 and a fourteenth point X14. That is, an area between the eleventh point X11 and the twelfth point X12 and an area between the thirteenth point X13 and the fourteenth point X14 may be included in a shade area of the first sub magnetic field.

Therefore, the external component 200 may not generate the first induced power (or, may generate no power) when the external component 200 is between the eleventh point X11 and the twelfth point X12 or is between the thirteenth point X13 and the fourteenth point X14 as the shade area.

A magnetic field generated by the electromagnetic induction device 100 in the second mode is illustrated in FIG. 2B. As illustrated in FIG. 2B, the second sub magnetic field may be formed above the electromagnetic induction panel 110 according to the first current I1 flowing through the first induction coil 111 (or, the first winding direction of the first induction coil 111) and the third current I3 flowing through the third induction coil 113 (or, the second winding direction of the third induction coil 113). Referring to FIG. 1 and FIG. 2B, the first current I1 of the first induction coil 111 may flow in a direction into a fourth point X4 out of a fifth point X5 along the first winding direction. Also, the third current I3 of the third induction coil 113 may flow in a direction into a sixth point X6 out of a third point X3 along the second winding direction. Therefore, since the first induction coil 111 is arranged through a fourth point X4 and a fifth point X5, and the third induction coil 113 is arranged through a third point X3 and a sixth point X6, the second sub magnetic field may appear strongly (or, intensively) between the third point X3 and the fourth point X4 and between the fifth point X5 and the sixth point X6 (i.e. the second region B and the third region C as shown in FIG. 1). In the location spaced apart from a top surface of the electronic induction panel 110 with a first distance Z1 in a third direction, the second sub magnetic field may appear strongly (or, intensively) between a fifteenth point X15 and a sixteenth point X16 and between a seventeenth point X17 and a eighteenth point X18 of the electromagnetic induction panel 110.

The second sub magnetic field may be formed between the fourth point X4 and the fifth point X5, but the second sub magnetic field may appear as insignificant (or, slightly) based on the first turns N1 of the first induction coil 111, the first current I1 of the first induction coil 111, the third turns N3 of the third induction coil 113, and the third current I3 of the third induction coil 113.

A magnetic field generated by the electromagnetic induction device 100 in the first mode and in the second mode is illustrated in FIG. 2C. For example, when the electromagnetic device 100 may alternately select the first mode and the second mode with a certain period, the electromagnetic induction device 100 may generate the magnetic field illustrated in FIG. 2C.

As illustrated in FIG. 2C, a first magnetic field may be the same as a sum of the first sub magnetic field illustrated in FIG. 2A and the second sub magnetic field illustrated in FIG. 2B. That is, the first magnetic field may be formed between the eleventh point X11 and the fourteenth point X14 with respect to the location spaced apart from a top surface of the electronic induction panel 110 with a first distance Z1 in a third direction.

Comparing with the first sub magnetic field illustrated in FIG. 2A, the first magnetic field illustrated in FIG. 2C may have a certain value in the shade area of the first sub magnetic field (e.g., between the eleventh point X11 and the twelfth point X12 and between the thirteenth point X13 and the fourteenth point X14) according to the second sub magnetic field as shown in FIG. 2B. Therefore, the shade area of the first magnetic field may be cleared (or, be eliminated).

Figure 3A:
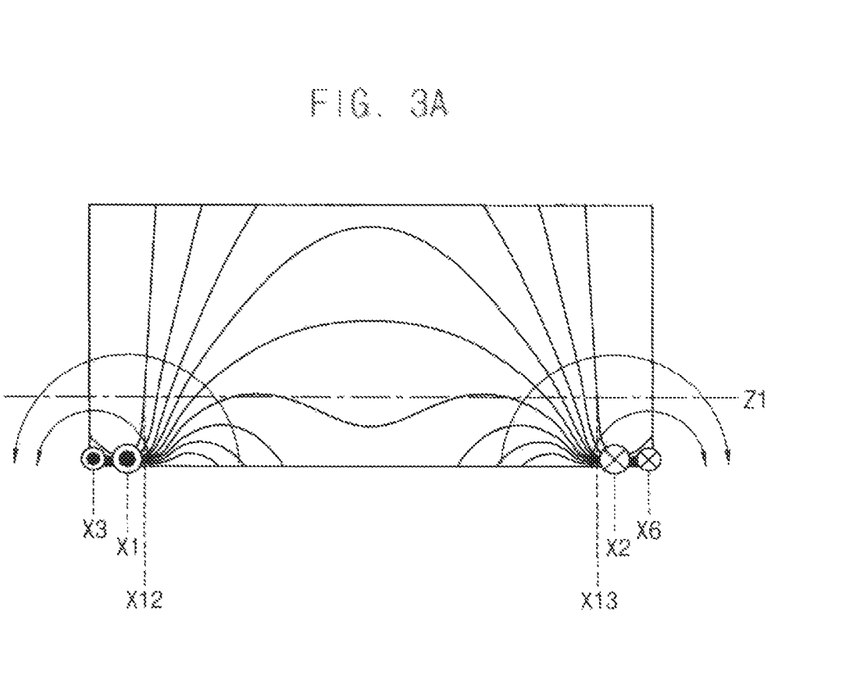
FIGS. 3A through 3C are diagrams illustrating another examples of a magnetic field generated by an electromagnetic induction panel included in the electromagnetic induction device of FIG. 1.
Figure 3B:
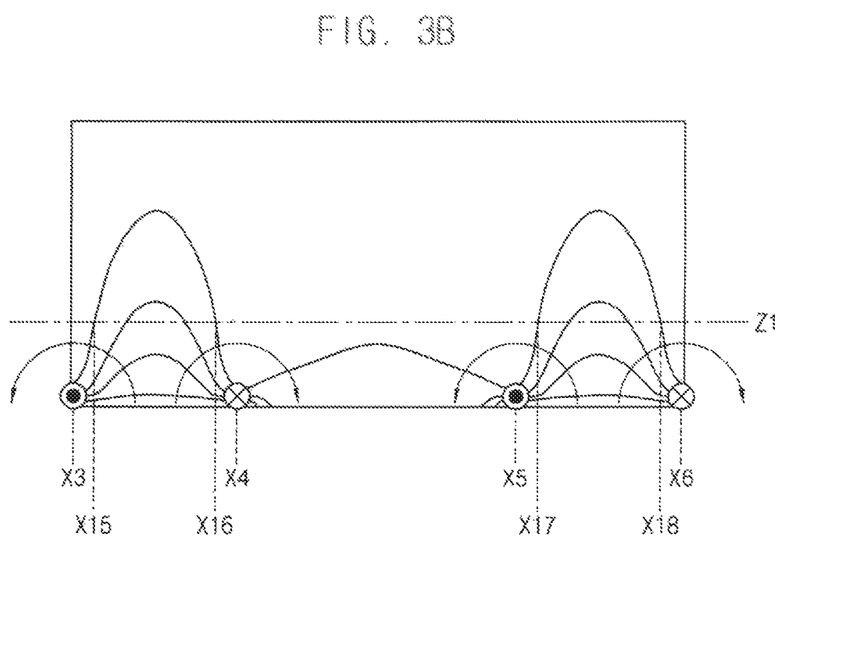
Figure 3C:
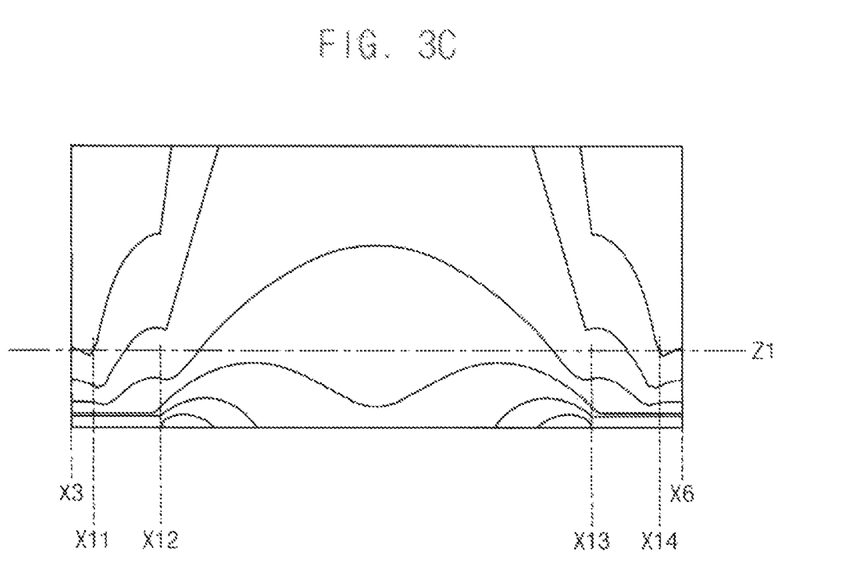

FIGS. 3A through 3C are diagrams illustrating another examples of a magnetic field generated by an electromagnetic induction panel included in the electromagnetic induction device of FIG. 1. A cross-sectional view of the electromagnetic induction panel 110 with respect to an axis I-I' illustrated in FIG. 1 and a magnetic field generated above the electromagnetic induction panel 110 are illustrated in FIGS. 3A through 3C.

Referring to FIGS. 1, and 3A through 3C, the electromagnetic induction device 100 may provide power to the electromagnetic induction panel 110 in association with a third mode and a fourth mode. In the third mode, the electromagnetic induction device 100 may provide the second current I2 to the second induction coil 112. In the fourth mode, the electromagnetic induction device 100 may provide the first current I1 to the first induction coil 111. Regardless of the third mode and the fourth mode, the electromagnetic induction device 100 may continuously provide the third current I3 to the third induction coil 113. That is, the electromagnetic induction device 100 (or, the power supplier 120) may provide the third current I3 to the third induction coil 113 independently of supplying of the first current I1 and supplying of the second current I2. The fourth mode may be substantially the same as the second mode described with reference to FIGS. 2A through 2C.

A first magnetic field generated by the electromagnetic induction device 100 in the third mode is illustrated in FIG. 3A. As illustrated in FIG. 3A, the first sub magnetic field may be formed above the electromagnetic induction panel 110 according to the second current I2 flowing through the second induction coil 112 (or, the second winding direction of the second induction coil 112) and the third current I3 flowing through the third induction coil 113 (or, the second winding direction of the third induction coil 113). The first sub magnetic field may appear strongly (or, intensively) between the first point X1 and the second point X2 more than the first magnetic field illustrated in FIG. 2A.

A second magnetic field generated by the electromagnetic induction device 100 in the second mode is illustrated in FIG. 3B. The second sub magnetic field illustrated in FIG. 3B may be substantially the same as the second sub magnetic field illustrated in FIG. 2B. Therefore, the duplicate description will not be repeated. As illustrated in FIG. 3B, in the location spaced apart from a top surface of the electronic induction panel 110 with a first distance Z1 in a third direction, the second sub magnetic field may appear strongly (or, intensively) between the fifteenth point X15 and the sixteenth point X16 and between the seventeenth point X17 and the eighteenth point X18 of the electromagnetic induction panel 110.

A first magnetic field generated by the electromagnetic induction device 100 in the third mode and in the fourth mode is illustrated in FIG. 3C. For example, when the electromagnetic device 100 may alternately select the third mode and the fourth mode with a certain period, the electromagnetic induction device 100 may generate the magnetic field illustrated in FIG. 3C.

As illustrated in FIG. 3C, the first magnetic field may be the same as a sum of the first sub magnetic field illustrated in FIG. 3A and the second sub magnetic field illustrated in FIG. 3B. That is, the first magnetic field may be formed between the eleventh point X11 and the fourteenth point X14 with respect to the location spaced apart from a top surface of the electronic induction panel 110 with a first distance Z1 in a third direction. The first magnetic field may appear strongly between the eleventh point X11 and the fourteenth point X14 more than the first magnetic field illustrated in FIG. 2C.

Compared with the first sub magnetic field illustrated in FIG. 3A, the first magnetic field illustrated in FIG. 3C may have a certain value in the shade area of the first sub magnetic field (e.g., between the eleventh point X11 and the twelfth point X12 and between the thirteenth point X13 and the fourteenth point X14) according to the second sub magnetic field as shown in FIG. 3B. Therefore, the shade area of the first magnetic field may be cleared (or, be eliminated). Here, although the external component 200 is between the eleventh point X11 and the twelfth point X12 and between the thirteenth point X13 and the fourteenth point X14, the external component 200 may be charged.

Figure 4:
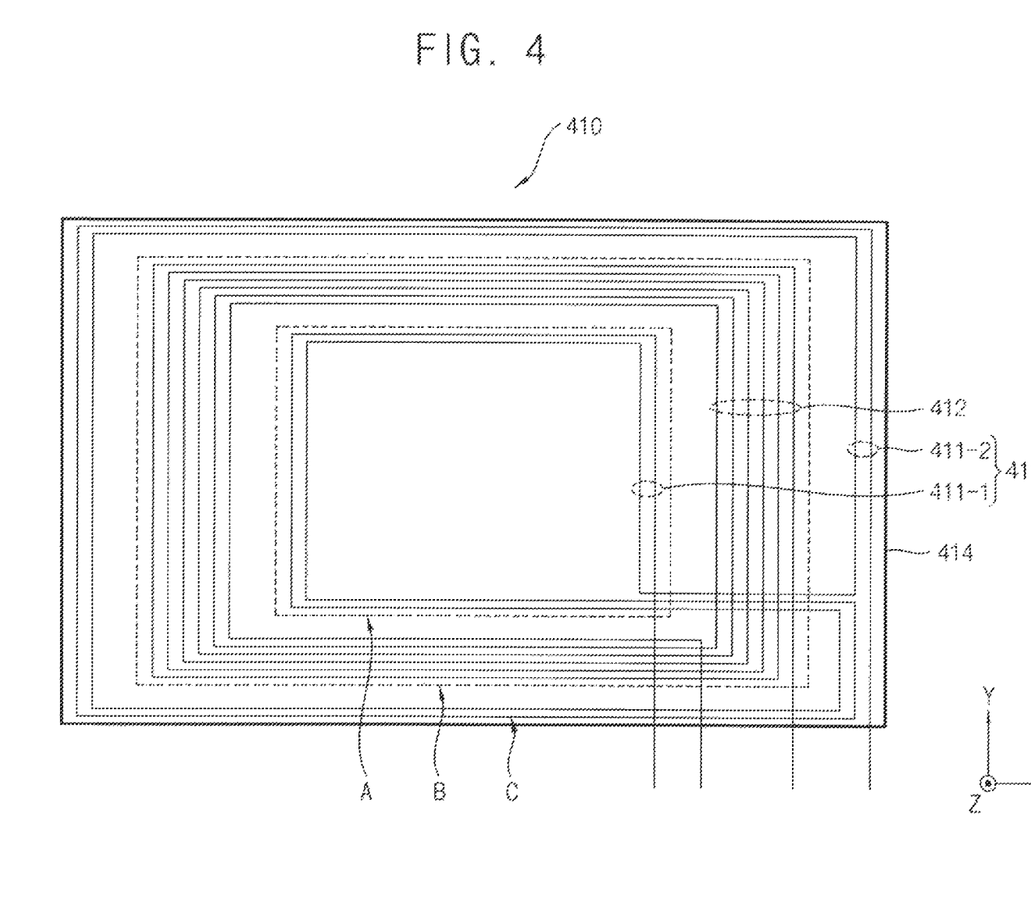
FIG. 4 is a diagram illustrating an example of an electromagnetic induction panel included in the electromagnetic induction device of FIG. 1.

FIG. 4 is a diagram illustrating an example of an electromagnetic induction panel included in the electromagnetic induction device of FIG. 1.

Referring to FIG. 4, the electromagnetic induction panel 410 may include a substrate 414, a fourth induction coil 411, and a second induction coil 412. The substrate may be substantially the same as the substrate described with reference to FIG. 1, and the second induction coil 412 may be substantially the same as the second induction coil 112. Therefore, duplicated descriptions will not be repeated.

The fourth induction coil 411 may be arranged on a first region A and a third region C (i.e., the first region A and the third region C described with reference to FIG. 1) of the substrate 414, may be wound in a first winding direction in the first region A, and may be wound in a second winding direction in the third region C. For example, a first sub induction coil 411-1 of the fourth coil 411 may be arranged along a boundary (or, an edge) of the first region A of the substrate 414 and may be wound in the first winding direction with a first turns N1. The second sub induction coil 411-2 may be arranged along a boundary (or, an edge) of the third region C of the substrate 414 and may be wound in the second winding direction with a third turns N3. Here, the first sub induction coil 411-1 may be substantially the same as the first induction coil 111 described with reference to FIG. 1, and the second sub induction coil 411-2 may be substantially the same as the third induction coil 113 described with reference to FIG. 1, A terminal of the first sub induction coil 411-1 may be electrically connected to a terminal of the second sub induction coil 411-2. Because the first winding direction of the first sub induction coil 411-1 is opposite to the second winding direction of the second sub induction coil 411-2, the fourth induction coil 411 may generate a second sub magnetic field, which penetrates a second region B (i.e., the second region B described with reference to FIG. 1) and has a third direction (e.g. positive direction of the z-axis), based on a first current of the fourth induction coil 411.

In some example embodiments, the fourth induction coil 411 may be alternatively wound (or, arranged) through the first region A and the third region C. As illustrated in FIG. 4, the fourth induction coil 411 may be wound with one turn in the third region C, may be wound with one turn in the first region A, may be wound with one turn in the third region C, and may be winded with one turn in the first region A, sequentially.

As described above, the electromagnetic induction panel 410 may generate (or, form) the first sub magnetic field above the first region A using the second induction coil 412 and may generate (or, form) the second sub magnetic field above the second region B using the fourth induction coil 411, where the second induction coil 412 is arranged in the second region B. Therefore, the electromagnetic induction panel 410 may clear (or, eliminate) a shade area (i.e., an area in which the first sub magnetic field is not formed, above the electromagnetic induction panel 410) of the first sub magnetic field.

Figure 5:
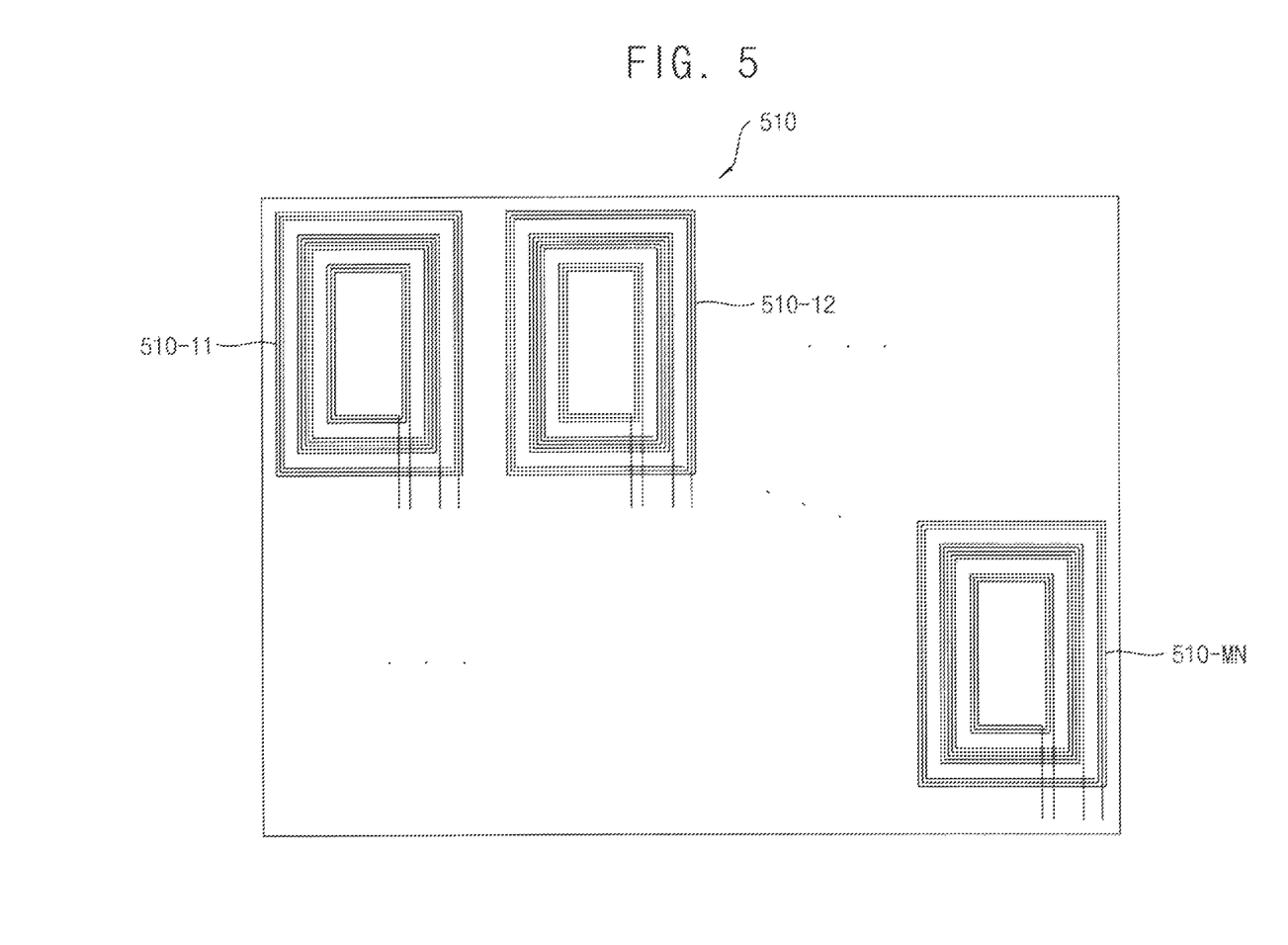
FIG. 5 is a diagram illustrating another example of an electromagnetic induction panel included in the electromagnetic induction device of FIG. 1.

FIG. 5 is a diagram illustrating another example of an electromagnetic induction panel included in the electromagnetic induction device of FIG. 1.

Referring to FIGS. 1 and 5, the electromagnetic induction panel 510 may include a substrate and electromagnetic induction units 510-11 through 510-MN, where M and N are positive integers satisfying M+N>2. A (ij)th electromagnetic induction unit 510-ij among the electromagnetic induction units 510-11 through 510-MN may include a substrate, the first induction coil 111, the second induction coil 112, and the third induction coil 113, where each of i and j is a positive integer. The substrate, the first induction coil 111, the second induction coil 112, and the third induction coil 113 may be substantially the same as the substrate, the first induction coil 111, the second induction coil 112, and the third induction coil 113 that are described with reference to FIG. 1, respectively. Therefore, duplicated descriptions will not be repeated.

In some example embodiments, the electromagnetic induction device 100 including the electromagnetic induction panel 510 may operate (or, drive) only an electromagnetic unit corresponding to a position of the external component 200. For example, the electromagnetic induction device 100 may operate all the electromagnetic induction units 510-11 through 510-MN at an initial driving time. Here, the external component 200, which is positioned (or, is located) at any point above the electromagnetic induction panel 510, may generate an induced magnetic field (or, induced electromotive force). The electromagnetic induction device 100 may determine the position of the external component 200 using induction coils (or, a loop antenna) which are included in the electromagnetic induction units 510-11 through 510-MN, respectively. After this, the electromagnetic induction device 100 may operate only an electromagnetic unit (e.g., an eleventh electromagnetic induction unit 510-11) corresponding to a determined position of the external component 200. Therefore, the electromagnetic induction device 100 may reduce consumption power.

Figure 6:
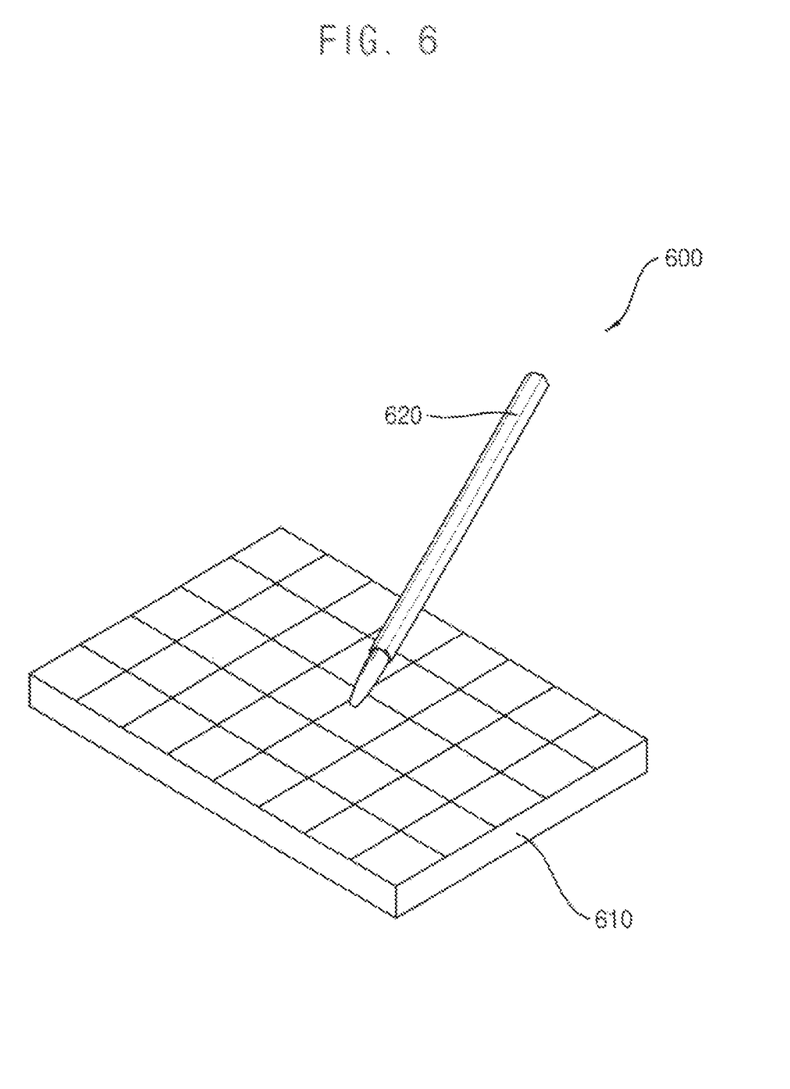
FIG. 6 is a diagram illustrating an example of a digitizer including the electromagnetic induction device of FIG. 1.

FIG. 6 is a diagram illustrating an example of a digitizer including the electromagnetic induction device of FIG. 1.

Referring to FIGS. 1 and 6, the digitizer 600 may include a tablet 610 and an electronic pen 620. The tablet 610 and the electronic pen 620 may be substantially the same as the electromagnetic induction device 100 and the external component 200 described with reference to FIG. 1. Therefore, duplicate description will not be repeated.

The electronic pen 620 may be attached to and be detached from the tablet 610 and, the digitizer 600 may determine (or, decide, detect) whether the electronic pen 620 is detached from the tablet 610. For example, the digitizer 600 may include a sensing device (e.g., a touch sensor, a pressure sensor, etc) and may determine whether or not the electronic pen 620 is detached from the tablet 610 based on a signal of the sensing device.

The digitizer 600 may drive the tablet 610 by alternately selecting a first mode and a second mode when the electronic pen 620 is detached from the tablet 610. Here, the first mode is the same as the first mode described with reference to FIG. 1, and the digitizer 600 may provide the second current I2 to the second induction coil 112 included in the tablet 610 in the first mode. The second mode is the same as the second mode described with reference to FIG. 1, and the digitizer 600 may provide the first current I1 to the first induction coil 111 included in the tablet 610 in the second mode. That is, the digitizer 600 may generate a first magnetic field using the tablet 610.

The electronic pen 620 may generate an induced magnetic field based on the first magnetic field. Here, the tablet 610 may determine a position (i.e., a position above the tablet 610) of the electronic pen 620 based on the induced magnetic field. The tablet 610 may select one among the first mode and the second mode based on the position of the electronic pen 620.

When the position of the electronic pen 620 is not determined (e.g., the electronic pen 620 is spaced apart from the tablet 610 more than a certain distance), the tablet 610 may generate the first magnetic field by alternately selecting the first mode and the second mode. Because the tablet 610 includes the electromagnetic induction panel 110 included in the electromagnetic induction device 100 of FIG. 1, the tablet 610 may recognize (or, sense, detect) the position of the electronic pen 620 which is at any point above a top surface of the tablet 610. Therefore, the tablet 610 may recognize the electronic pen 620 without a shade area. In addition, the tablet 610 may reduce power consumption by determining an operation mode (or, selecting one of the first mode and the second mode) based on the position of the electronic pen 620.

Figure 7:
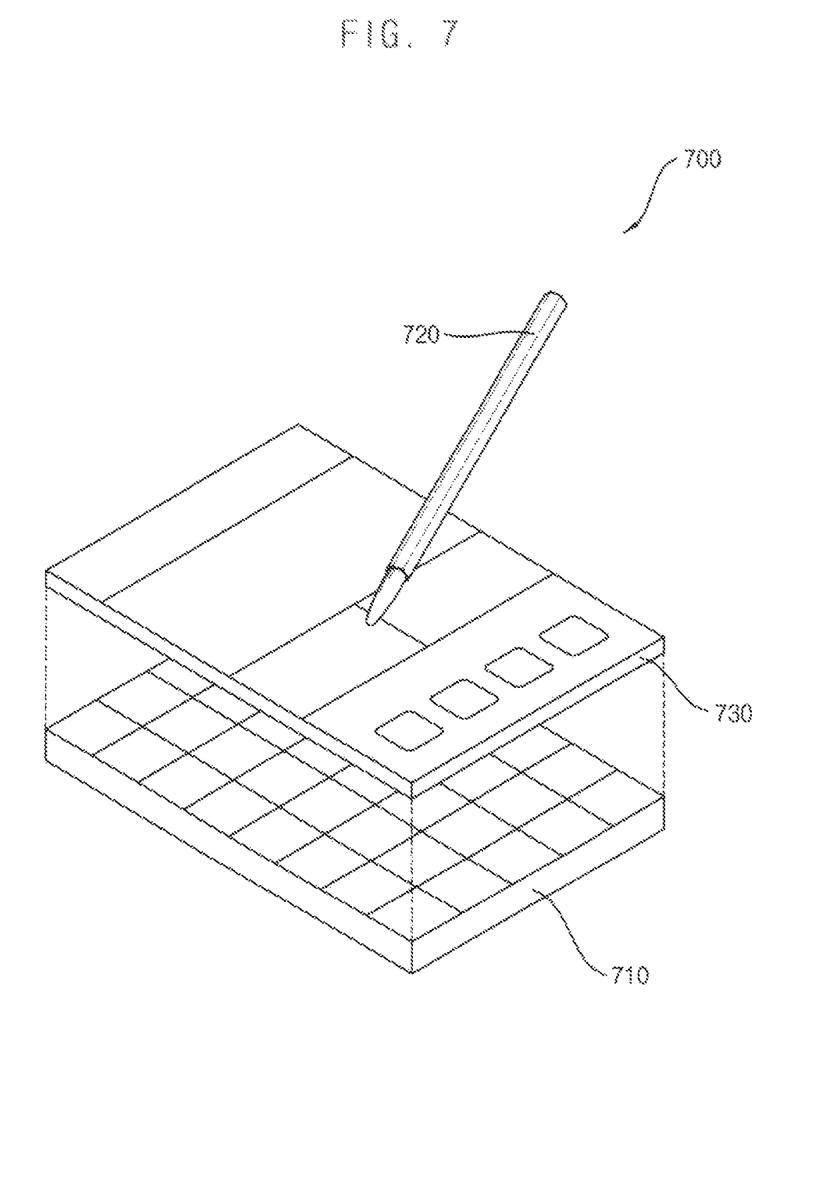
FIG. 7 is a diagram illustrating an example of a display device including the electromagnetic induction device of FIG. 1.

FIG. 7 is a diagram illustrating an example of a display device including the electromagnetic induction device of FIG. 1.

Referring to FIGS. 1 and 7, the display device 700 may include a display panel 730, an electromagnetic induction panel 710, an electronic pen 720, and a power supplier (not shown). The display panel 730 may include pixels and may display an image based on input image data. For example, the display panel 730 may be an organic light emitting display panel.

The electromagnetic induction panel 710, the electronic pen 720, and the power supplier may be substantially the same as or similar to the electromagnetic induction panel 110, the external component 200, and the power supplier 120, respectively.

The electromagnetic induction panel 710 may include a substrate, which is placed against the display panel 730, and the first induction coil 111 through the third induction coil 113.

FIG. 7 illustrates that the electromagnetic induction panel 710 may be below a lower surface of the display panel 730, however the electromagnetic induction panel 710 is not limited thereto. For example, the electromagnetic induction panel 710 may include a substrate of transparent materials and may be placed on an upper surface of the display panel 730.

Figure 8:
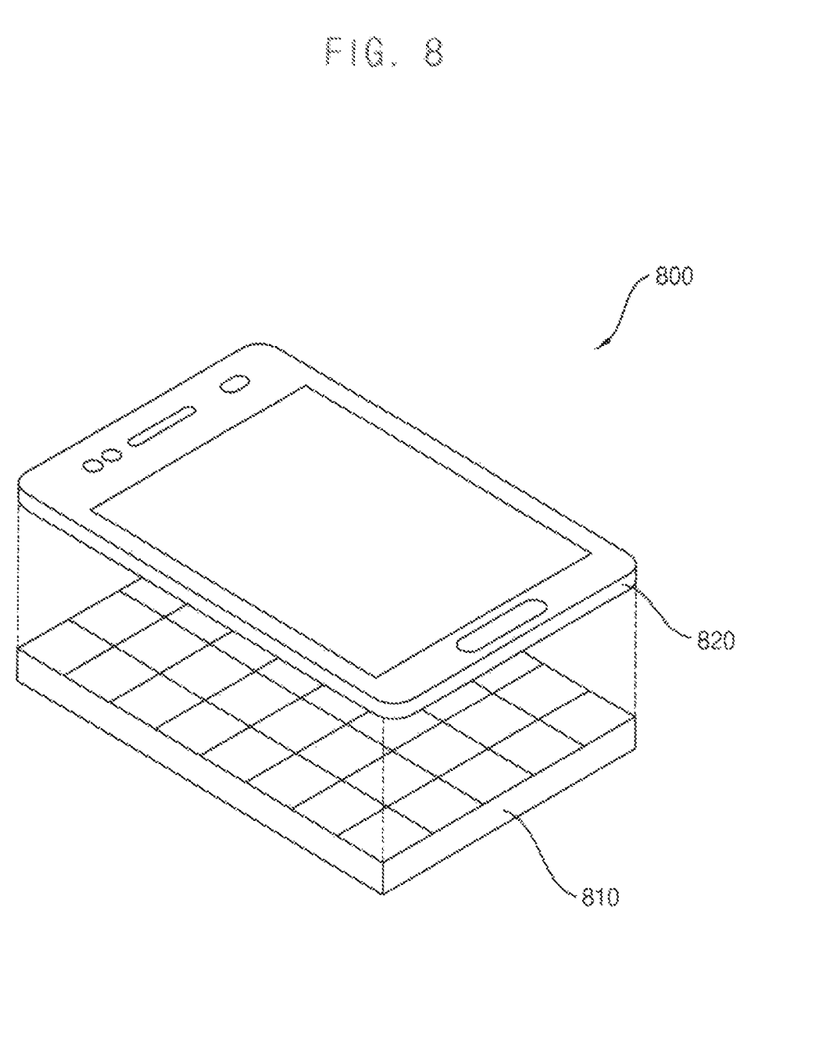
FIG. 8 is a diagram illustrating an example of a wireless charging device including the electromagnetic induction device of FIG. 1.

FIG. 8 is a diagram illustrating an example of a wireless charging device including the electromagnetic induction device of FIG. 1.

Referring to FIGS. 1 and 8, the wireless charging device 800 may include a wireless charging pad 810 and a mobile device 820. The wireless charging pad 810 and the mobile device 820 may be substantially the same as or similar to the electromagnetic induction device 100 and the external component 200, respectively.

In some example embodiments, the wireless charging pad 810 may include the electromagnetic induction panel of FIG. 5. The wireless charging pad 810 may drive only an electromagnetic induction unit corresponding to a position of the mobile device among a plurality of the mobile devices. The wireless charging pad 810 may provide power to mobile devices using electromagnetic induction units, respectively.

The mobile device 820 may generate an induced power based on a first magnetic field generated by the wireless charging pad 810 and may charge an internal battery using the induced power. Like the external device 200 described with reference to FIG. 1, the mobile device 820 may include a circuit that generates an induced electromagnetic field. Here, the wireless charging pad 810 may calculate (or, determine, sense, detect) a position of the mobile device 820 based on the induced electromagnetic field.

The wireless charging device 800 may charge the mobile device 820 which is at any point above a top surface of the wireless charging pad 810, because the wireless charging device 800 includes the electromagnetic induction panel 110 included in the electromagnetic induction device 100 of FIG. 1. That is, the wireless charging pad 810 may charge the mobile device 820 without a shade area. In addition, the wireless charging pad 810 may reduce power consumption by determining an operation mode (or, selecting one of a first mode and a second mode, selecting and driving any electromagnetic induction unit among electromagnetic induction units) based on a position of the mobile device 820.

The present inventive concept may be applied to any electronic devices including an electromagnetic induction panel. For example, the present inventive concept may be applied to a digitizer, a laptop, a cellular phone, a smart phone, a personal digital assistant (PDA), a portable multimedia player (PMP), a navigation system, a wireless charging device, etc.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An electromagnetic induction panel, comprising:
   a substrate including a first region, a second region, and a third region;
   a first induction coil arranged along an edge of the first region of the substrate and wound in a first winding direction;
   a second induction coil arranged along an edge of the second region and wound in a second winding direction opposite to the first winding direction, the second region surrounding the first region; and
   a third induction coil arranged along an edge of the third region and wound in the second winding direction, the third region surrounding the second region,
   wherein the second induction coil generates a first sub magnetic field associated with a second current of the second induction coil, the first sub magnetic field penetrating the first region.

2. The electromagnetic induction panel of claim 1, wherein the first induction coil and the third induction coil generate a second sub magnetic field associated with a first current of the first induction coil and a third current of the third induction coil, the second sub magnetic field penetrating at least one of the second region and the third region.

3. The electromagnetic induction panel of claim 2, wherein a terminal of the first induction coil is electrically coupled to a terminal of the third induction coil, and
   wherein the first current is the third current.

4. An electromagnetic induction device, comprising:
   an electromagnetic induction panel including:
   a substrate including a first region, a second region, and a third region;
   a first induction coil arranged along an edge of a first region of the substrate and wound in a first winding direction;
   a second induction coil arranged along an edge of a second region and wound in a second winding direction opposite to the first winding direction, the second region surrounding the first region; and
   a third induction coil arranged along an edge of a third region and wound in the second winding direction, the third region surrounding the second region; and
   a power supplier configured to provide a first current to the first induction coil or a second current to the second induction coil according to each of operation modes,
   wherein the power supplier provides a third current to the third induction coil in at least one mode among the operation modes, and
   wherein the second induction coil generates a first sub magnetic field associated with the second current, the first sub magnetic field penetrating the first region.

5. The electromagnetic induction device of claim 4,
   wherein the first induction coil and the third induction coil generate a second sub magnetic field associated with the first current and the third current, the second sub magnetic field penetrating the second region.

6. The electromagnetic induction device of claim 4, wherein the power supplier senses an induction magnetic field, which is generated by an external component, using at least one of the first induction coil, the second induction coil, and the third induction coil.

7. The electromagnetic induction device of claim 4, further comprising:
a loop antenna disposed along a boundary between the first region and the second region of the electromagnetic induction panel; and
a sensor configured to sense an induction magnetic field generated by an external component using the loop antenna.

8. The electromagnetic induction device of claim 7, wherein the sensor determines a position of the external component above the electromagnetic induction panel based on the induction magnetic field.

9. The electromagnetic induction device of claim 8, further comprising:
a controller configured to select one of a first mode and a second mode based on the position of the external component,
wherein the power supplier provides the second current to the second induction coil in the first mode and provides the first current to the first induction coil in the second mode.

10. The electromagnetic induction device of claim 9, wherein the controller selects the first mode when the external component is above the first region and selects the second mode when the external component is above the second region or the third region.

11. The electromagnetic induction device of claim 9, wherein the controller alternately selects the first mode and the second mode before the sensor determines the position of the external component.

12. The electromagnetic induction device of claim 9, wherein the power supplier provides the third current to the third induction coil regardless of the first mode and the second mode.

13. The electromagnetic induction device of claim 4, wherein a terminal of the first induction coil is electrically coupled to a terminal of the third induction coil, and
wherein the first current is the third current.

14. The electromagnetic induction device of claim 4, wherein a first turns of the first induction coil is greater than a third turns of the third induction coil.

15. The electromagnetic induction device of claim 4, wherein the first current is larger than the third current.

16. A display device, comprising:
a display panel including pixels; and
an electromagnetic panel including:
a substrate placed against the display panel;
a first induction coil arranged along an edge of a first region of the substrate and wound in a first winding direction;
a second induction coil arranged along an edge of a second region and wound in a second winding direction opposite to the first winding direction, the second region surrounding the first region;
a third induction coil arranged along an edge of a third region and winded in the second winding direction, the third region surrounding the second region;
a power supplier configured to provide a third current to the third induction coil and to selectively provide a second current to the second induction coil or a first current to the first induction coil; and
an external component configured to generate a first induction power based on a first magnetic field generated by the electromagnetic induction panel and to generate an induction magnetic field based on the first induction power.

17. The display device of claim 16, further comprising:
a loop antenna disposed along a boundary between the first region and the second region of the electromagnetic induction panel; and
a sensor configured to sense an induction magnetic field generated by the external component using the loop antenna and to determine a position of the external component above the electromagnetic induction panel based on the induction magnetic field.

18. The display device of claim 17, further comprising:
a controller configured to select one among a first mode and a second mode based on the position of the external component,
wherein the power supplier provides the second current to the second induction coil in the first mode and provides the first current to the first induction coil in the second mode.

19. The display device of claim 18, wherein the controller determines whether the external device is detached from the display device and selects one among the first mode and the second mode or alternately selects the first mode and the second mode when the external device is detached from the display device.

* * * * *